United States Patent Office 2,888,346
Patented May 26, 1959

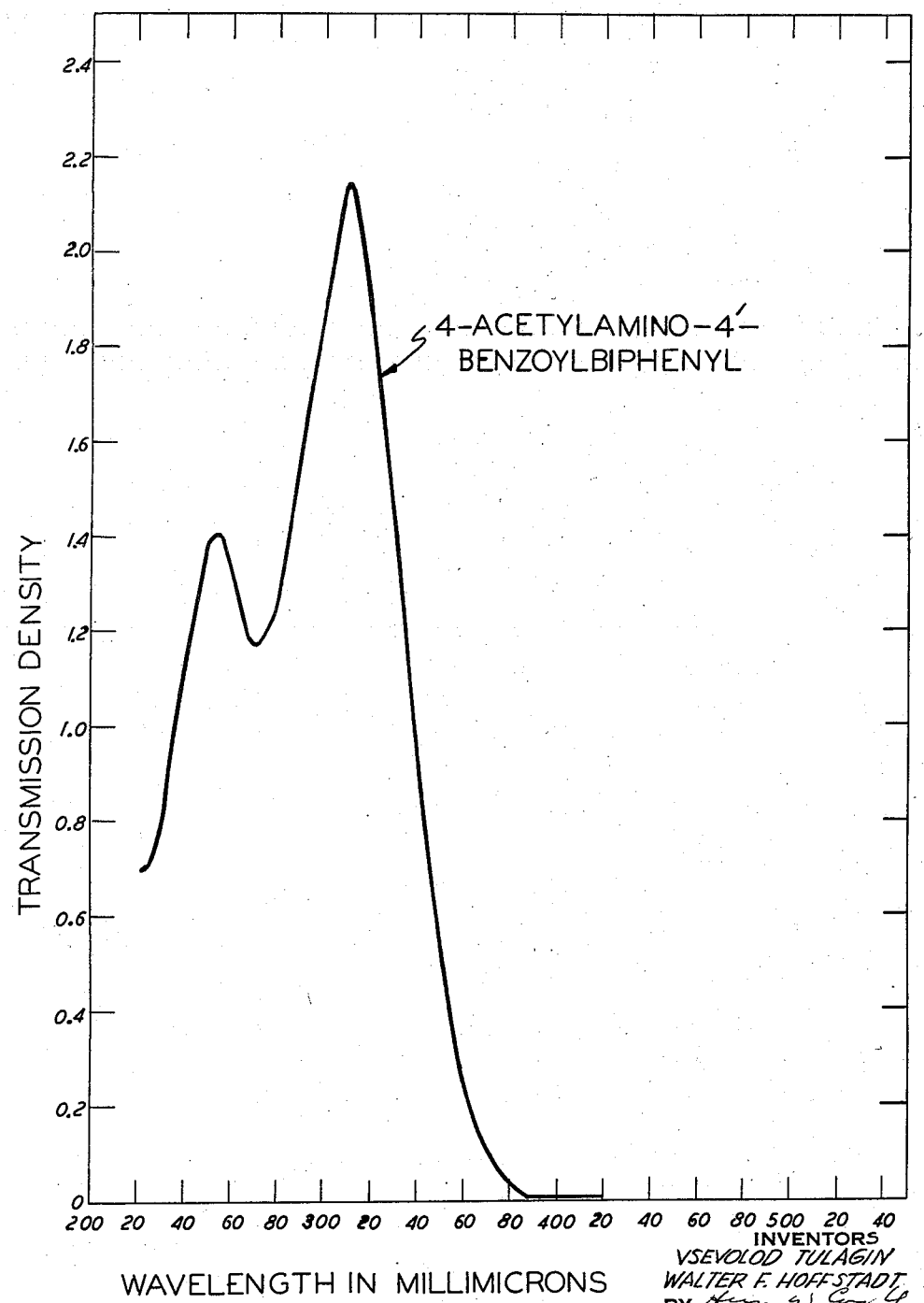

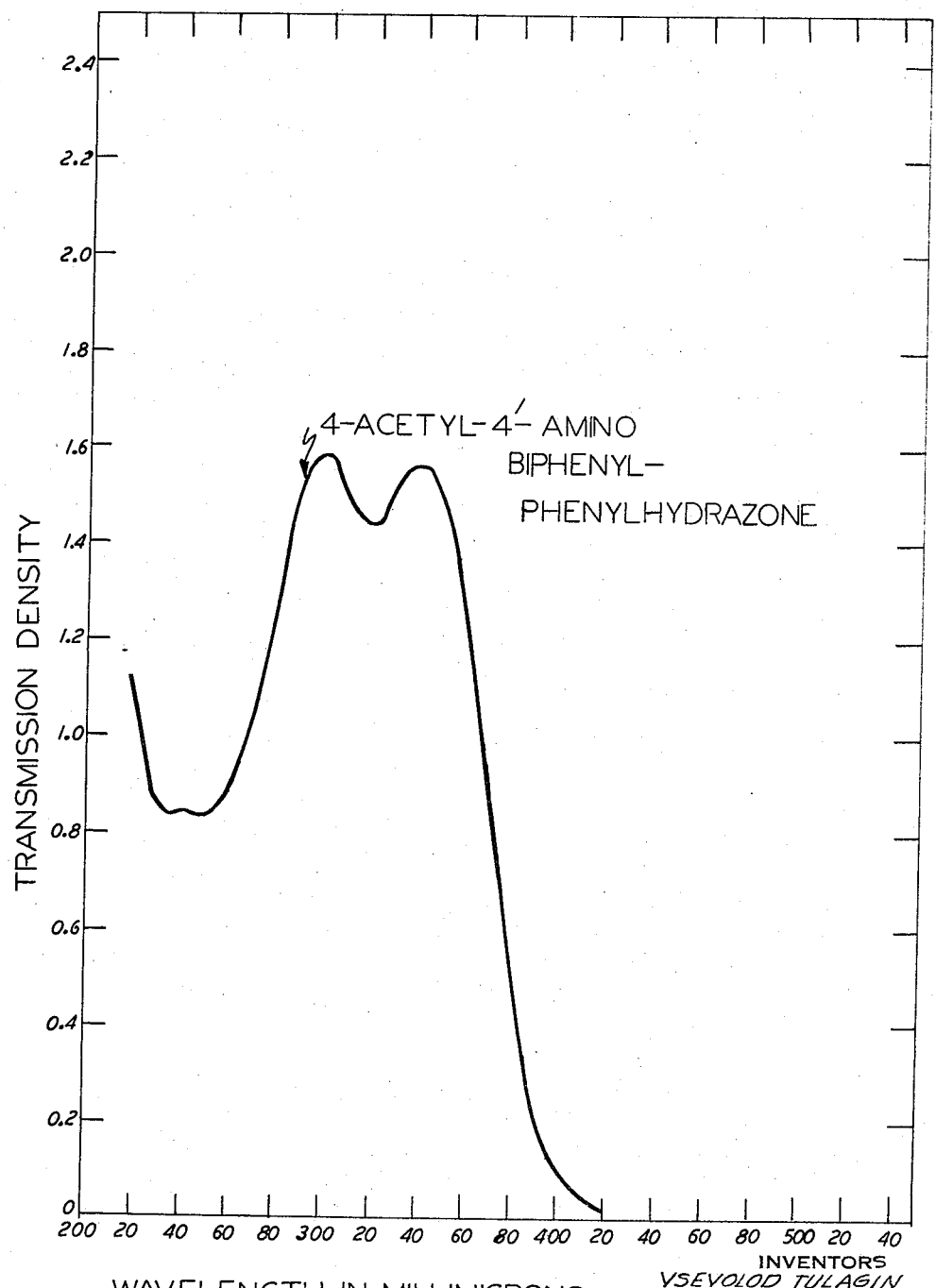

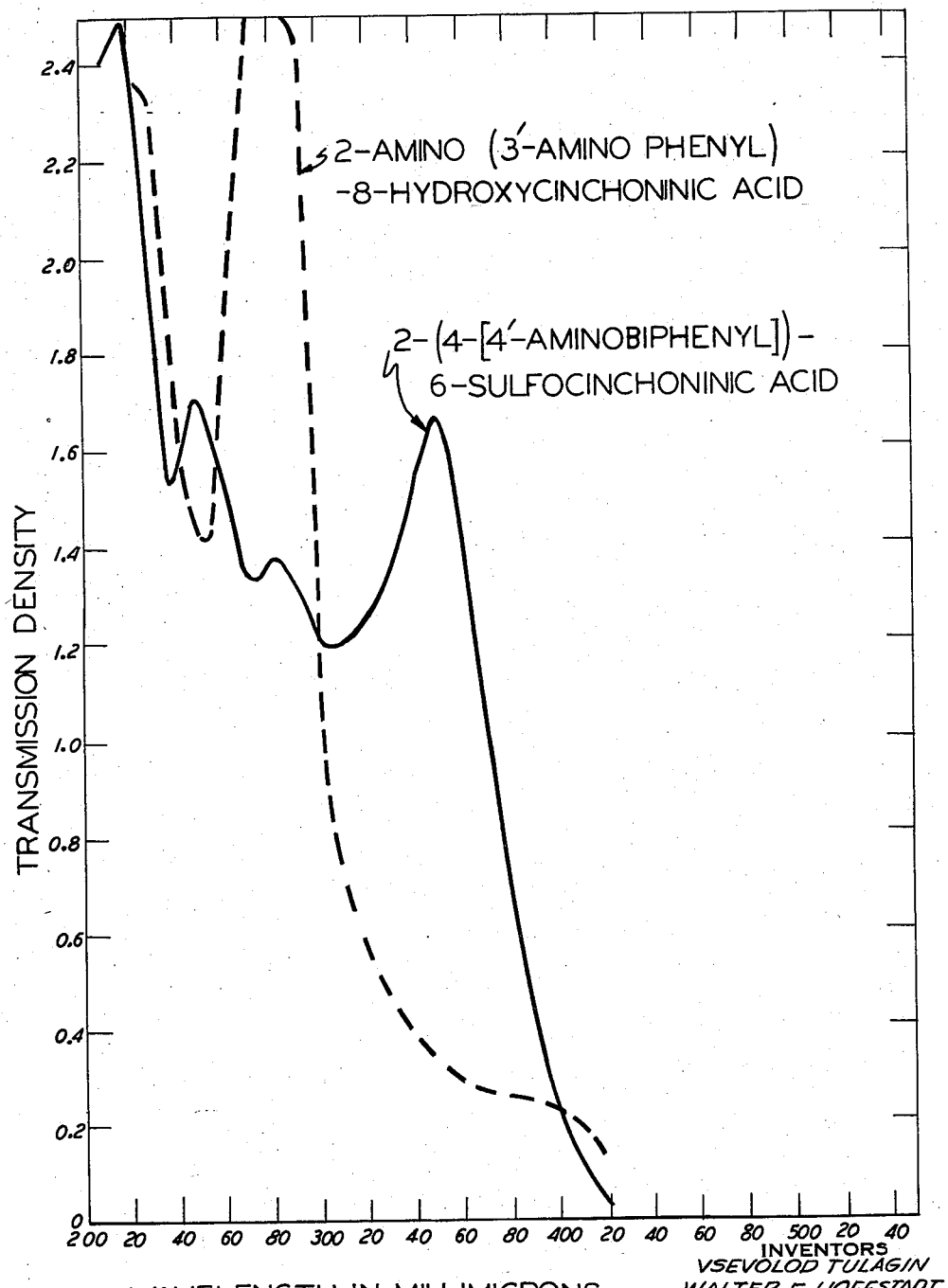
FIG III

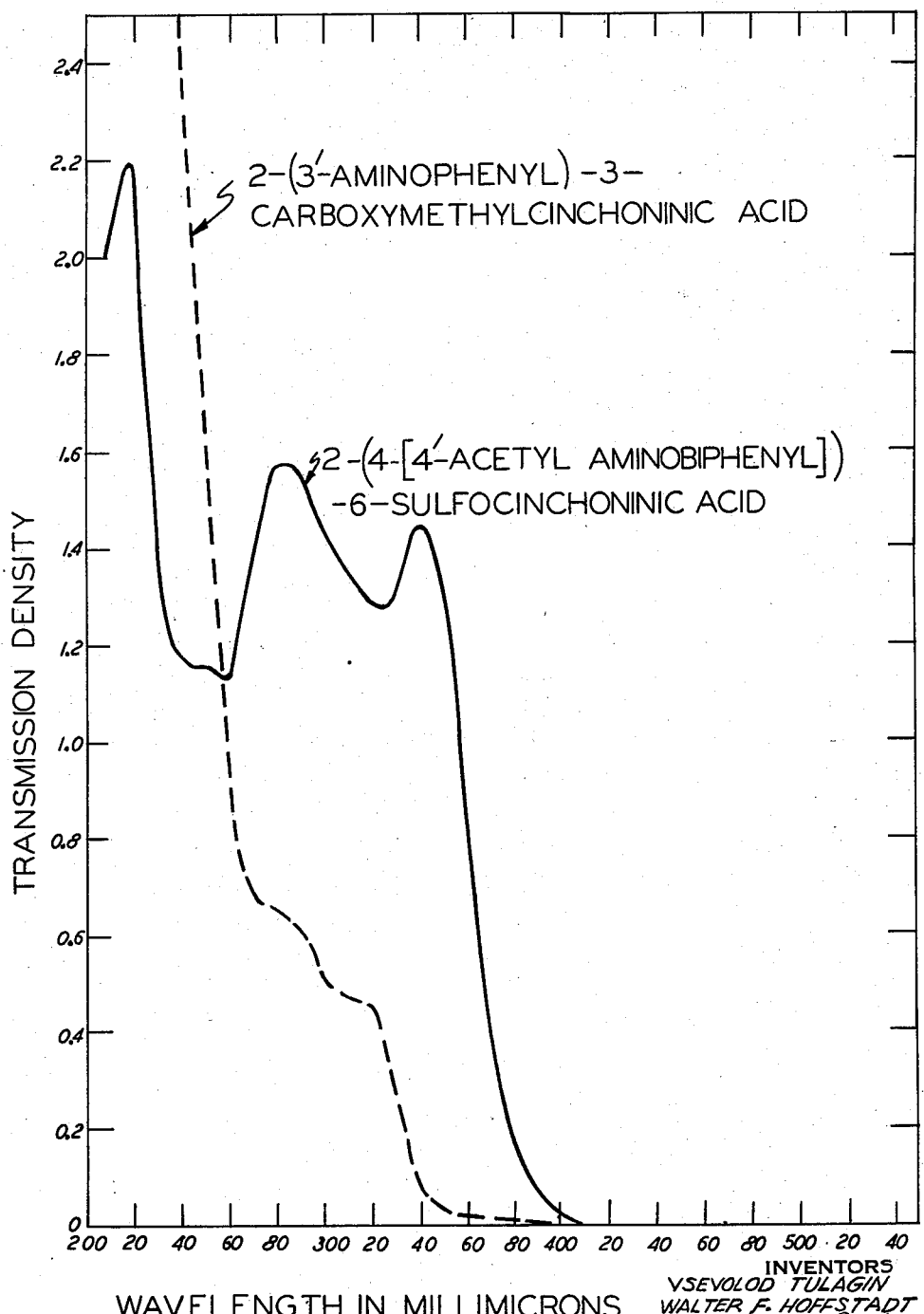
FIG IV

2,888,346
ULTRA-VIOLET ABSORBING COMPOUNDS

Vsevolod Tulagin, Binghamton, and Walter F. Hoffstadt, Vestal, N.Y., assignors to General Aniline & Film Corporation, New York, N.Y., a corporation of Delaware Application August 22, 1955, Serial No. 529,682

3 Claims. (Cl. 96—84)

The present invention relates to ultra-violet absorbers and compositions containing the same which are particularly suitable for protecting organic media from damage by exposure to ultra-violet radiation.

Industry has become increasingly aware of the damage which may be wrought to various organic systems through the effect of ultra-violet light. Said damage runs the gamut from acceleration of the degradation of certain foodstuffs, such as fruits, oils and fats, to injury to the human body by excessive sunburn. Fading of colored objects, such as textiles, photographic prints and the like, is often attributable to long exposure to sunlight. Plastics, resins and other film-forming materials are rendered brittle and often caused to deteriorate through ultra-violet radiation.

A recognition of the havoc which can be wrought by ultra-violet light to certain organic media has led to the use of various compounds called U.V. absorbers as protecting agents for such media. To this end, it has been recommended that films, foils and the like be prepared with a content of such substances as 2,4-dihydroxy acetophenone; 2,4'-dihydroxy benzophenone; 4-benzoylresorcinol; 2-phenylcinchoninic acid; 3'-amino-phenyl-8-hydroxycinchoninic acid; 2'-amino-2-phenylcinchoninic acid; 4'-amino-2-phenyl-3-carboxyethylcinchoninic acid and the like, and the resulting films and foils used as wrappings or protective coatings for foods, textiles, photographic colored prints and other media subject to change under the influence of ultra-violet light. While many of the substances involved are effective when coated or used in relatively thick layers or masses such as those ranging from 50 m$\mu$ upward, the results obtained therewith are far from optimum when employed in relatively thin layers such as those of a few m$\mu$. In the latter case, such compounds have very little absorbing power for U.V. light and, hence, are incapable of operating to avert the damaging effect of such light rays.

We have now discovered that xenylamines are brilliant minus ultra-violet dyes in that they possess high extinction coefficients in the ultra-violet with a particularly sharp drop in absorption on the edge of the visible range of the spectrum. This class of compounds, when utilized in extremely thin layers or masses of only a m$\mu$ or two in thickness, is, nevertheless, highly effective U.V. absorbents. They may, therefore, be used in any relationship where U.V. absorbers have been employed in the past while obtaining the desired protection against the deleterious effect of these light rays.

The utilization of xenylamines as U.V. absorbents and such compounds which contain a quinoline nucleus per se, constitute the purposes and objects of the present invention.

The xenylamines, the use of which is contemplated herein, are typified by the presence therein of the following organic system:

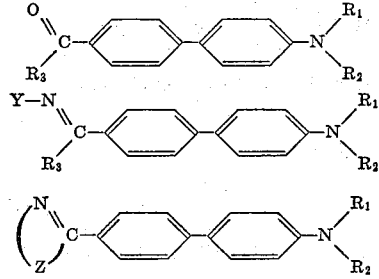

in which X is an oxygen or nitrogen atom, the nitrogen atom being, if desired, a part of a quinoline ring system.

The compounds possessing this structure may be more precisely defined by the following structural formulae:

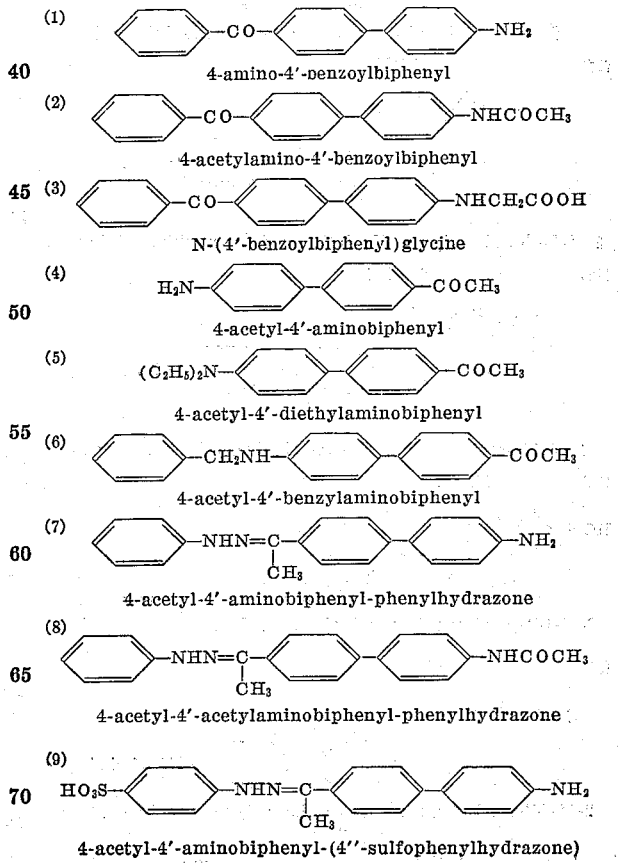

in which $R_1$ is hydrogen, alkyl, such as methyl, ethyl, propyl, butyl, amyl, octyl, dodecyl, lauryl, octadecyl and the like; an aromatic radical such as aryl, i.e., phenyl, naphthyl; sulfoaryl, i.e., sulfophenyl; arylsulfophenyl, i.e., phenylsulfophenyl, methylphenylsulfophenyl, ethylphenylsulfophenyl and the like; aralkyl, such as benzyl, methylnaphthyl and the like; $R_2$ is hydrogen, alkyl as above, an aromatic radical as above; acyl, such as acetyl, propionyl, butyryl, stearoyl, ureido and the like; carboxyalkyl, such as carboxymethyl, carboxyethyl and the like; or alkylsulfonyl, such as methylsulfonyl, ethylsulfonyl and the like; $R_3$ is alkyl as above or aryl, such as phenyl, naphthyl and the like; Y is hydroxyl or arylimino, such as phenylimino, sulfophenylimino and the like; and Z represents the atoms necessary to complete a quinoline ring system.

The following compounds, embraced by the above structural formulae, are illustrative of those which we have found to be suitable for our purposes:

(1) 4-amino-4'-benzoylbiphenyl (2) 4-acetylamino-4'-benzoylbiphenyl (3) N-(4'-benzoylbiphenyl)glycine (4) 4-acetyl-4'-aminobiphenyl (5) 4-acetyl-4'-diethylaminobiphenyl (6) 4-acetyl-4'-benzylaminobiphenyl (7) 4-acetyl-4'-aminobiphenyl-phenylhydrazone (8) 4-acetyl-4'-acetylaminobiphenyl-phenylhydrazone (9) 4-acetyl-4'-aminobiphenyl-(4''-sulfophenylhydrazone)

(10) 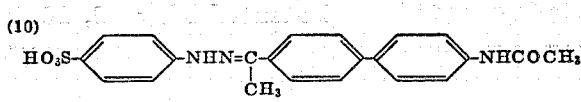
4-acetyl-4'-acetylaminobiphenyl-(4''-sulfophenylhydrazone)

(11) 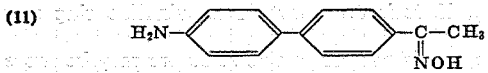
4-acetyl-4'-aminobiphenyloxime

(12) 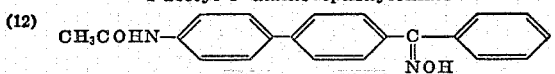
4-acetylamino-4'-benzoylbiphenyloxime

(13) 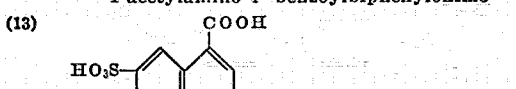
2-(4-[4'-aminobiphenyl])-6-sulfocinchoninic acid

(14) 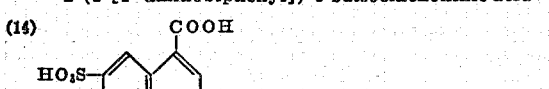
2-(4-[4'-acetylaminobiphenyl])-6-sulfocinchoninic acid

(15) 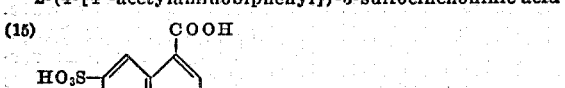
2-(4-[4'-myristoylaminobiphenyl])-6-sulfocinchoninic acid

(16) 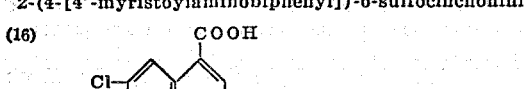
2-(4-[4'-aminobiphenyl])-6-chlorocinchoninic acid

(17) 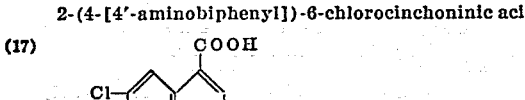
2-(4-[-4'-aminobiphenyl])-6-chloro-8-bromocinchoninic acid

(18) 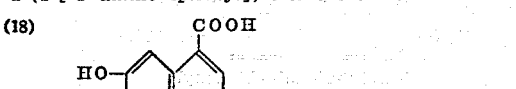
2-(4-[4'-aminobiphenyl])-6,8-dihydroxycinchoninic acid

(19) 
2-(4-[4'-p-toluylsulfonamidobiphenyl])-6-sulfocinchoninic acid

(20) 
2-(4-[4'-methylsulfonamidobiphenyl])-6-sulfocinchoninic acid

(21) 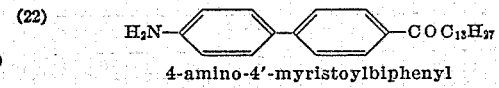
2-(4-[4'-N-ureabiphenyl])-6-sulfocinchoninic acid

(22) 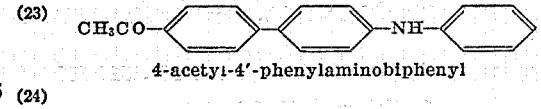
4-amino-4'-myristoylbiphenyl

(23) 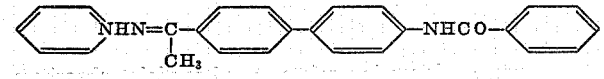
4-acetyl-4'-phenylaminobiphenyl

(24) 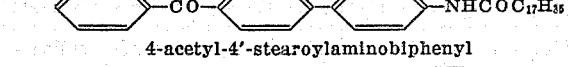
4-acetyl-4'-benzoylaminobiphenyl-phenylhydrazone

(25) 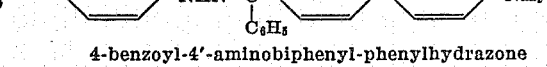
4-acetyl-4'-stearoylaminobiphenyl

(26) 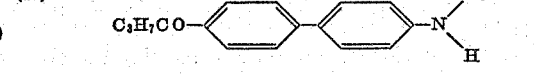
4-benzoyl-4'-aminobiphenyl-phenylhydrazone

(27) 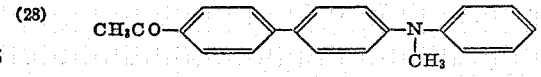
4-propionyl-4'-butyrylaminobiphenyl

(28) 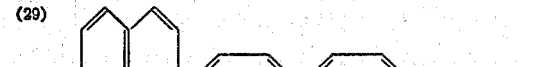
4-acetyl-4'-N-phenyl-N-methylaminobiphenyl

(29) 
2-(4'-[4'-acetylaminobiphenyl])-quinoline

The compounds listed above, excepting those possessing a quinoline structure, are known compounds and, in any case, may be prepared by a simple synthesis. Thus, the 4-amino-4'-acylbiphenyl derivatives may be prepared by condensing 4-acetylaminobiphenyl with the desired acyl chloride while using aluminum chloride as the condensing agent. If the free base is desired, the acetyl grouping is removed by hydrolysis.

Alkylation, arylation or aralkylation of the free amino group may be effected by utilization of the desired alkyl-, aryl- or aralkyl halide with an acid acceptor.

The phenylhydrazone derivatives are prepared by refluxing the desired 4-acyl-4'-aminobiphenyl with phenylhydrazine in the presence of an acid acceptor, such as pyridine. The amino group in the biphenyl radical may then be acylated, alkylated or aralkylated, according to usual practice.

The oxime derivatives are produced by refluxing the desired 4-acyl-4'-aminobiphenyl with hydroxylamine hydrochloride in the presence of an acid acceptor.

Those compounds considered to be novel, and which contain a quinoline ring system, may be prepared by refluxing isatin or a derivative thereof with a 4-acyl-4'-aminobiphenyl in an alkaline solution. After cooling, the reaction mixture is filtered and the end product purified by treatment with acid and solvents.

The xenylamine derivatives may be utilized as protective agents in any of the relationships discussed in U.S. Patent 2,568,894, granted September 25, 1951. Thus, such compounds may be incorporated in films, foils or layers of plastics, resins, or colloids, and the resulting products used as protective foils or coatings for substances susceptible to degradation or change under the action of ultra-violet light. Similarly, the compounds may be incorporated in waxes, paints, varnishes, enamels, and the like.

The quantity of the xenylamine derivatives which is employed will depend upon the thickness of the layer or mass in which it is incorporated, and will be greater the less the thickness of the layer or mass. Usually the compound will be employed in an amount ranging from 1 to 50% by weight of the material in which it is employed. In films having a thickness ranging upward from one m$\mu$, the amounts will vary from about 20 to 50%. With films having a thickness of 15 m$\mu$ or more, effective results are secured with amounts of the U.V. absorber ranging from about 5 to 10%.

The xenylamines may be introduced into the desired carrier by dissolving the carrier and selected xenylamine in an organic solvent or mixtures thereof and casting, extruding or similarly shaping the resulting solution. The U.V. absorbers may also be added to polymerizable organic materials capable of forming substantially transparent carriers and the monomers polymerized in the presence of the absorber. If the carrier in which the U.V. absorber is to appear is a water soluble colloid, such as gelatin, the absorber and gelatin may be dissolved in water in the presence of aqueous alkalies and the resulting solution used as a coating material.

The U. V. absorbers, as previously indicated, are particularly effective when compared to known absorbers in extremely thin layers, for instance, those used as overcoatings to protect color photographic prints. Such coatings are advantageously applied as a surface coating over the sensitized layers in the manufacture of the color material. Sensitized multilayer photographic material will not tolerate a thick outer coating of say 40 to 50 m$\mu$. It is possible with our U.V. absorbers to apply surface coatings of a thickness of only a few m$\mu$, while still securing protection of the colored images from degradation by ultraviolet light.

The invention is illustrated by the following examples, particularly when taken with the accompanying self-explanatory drawings depicting curves resulting from plotting transmission density of certain of the compounds as ordinates against wave length in microns as abscissas. The characteristics given for the compounds of the following examples were obtained with solutions resulting from dissolving 35 mg. of the compound in a liter of water and neutralizing with potassium hydroxide.

Example I

Into a one-liter, three-necked flask fitted with a stirrer and condenser, were placed 250 ml. of carbon disulfide and 56.2 grams of benzoyl chloride. The mixture was chilled in an ice bath and 63.3 grams of finely ground 4-acetylaminobiphenyl introduced. 79.1 grams of powdered anhydrous aluminum chloride were then added portionwise with good stirring while in the ice bath. The reaction mixture was stirred for a further 10 minutes after the addition was completed. The ice bath was removed and the reaction mixture allowed to warm to room temperature. After stirring overnight, the carbon disulfide was decanted and the residue decomposed with a mixture of ice in hydrochloric acid. The solids were collected on a Büchner funnel and washed with water, then recrystallized from about one liter of acetic acid. The yield of 4-acetylamino-4'-benzoylbiphenyl was 43.0 grams (45.5%) with a melting point of 212° C.

This compound, the curve of which is depicted in Figure I, showed two absorption peaks, a primary at a wave length of 310 m$\mu$ and a secondary at a wave length of 250 m$\mu$. The log of molecular extinction coefficient amounted to 4.458.

The 4-acetylamino-4'-benzoylbiphenyl is hydrolyzed to the free amine by refluxing for six hours in a mixture of acetic acid (200 ml.) and 18 N sulfuric acid (100 ml.). The solution was cooled somewhat and methanol was added to the crystallization point. After cooling and collection of the solids, they were suspended in boiling ethanol which was then made alkaline with sodium hydroxide solution and the resulting solution filtered from insoluble materials, which was again extracted and filtered. The combined filtrates were chilled and the yellow needles collected on a Büchner funnel, washed with cold dilute alcohol and dried. The yield was 13 grams (68.6%) with a melting point of 148-149° C.

This compound has an absorption peak at 360 m$\mu$ with a log of molecular extinction coefficient of 4.302.

Example II

Into a 300 ml., three-necked flask fitted with an agitator and reflux condenser were placed 10.4 grams of 4-amino-4'-benzoylbiphenyl, 3.8 grams of chloracetic acid, 6.6 grams of anhydrous sodium acetate, 90.0 ml. of absolute alcohol and 10 ml. of water. The reactants were heated under reflux with stirring for 24 hours. After cooling somewhat, the solids were collected by filtration and washed with alcohol. The filter cake was then suspended in 150 ml. of boiling dimethyl formamide and water added until the cake dissolved. The resulting solution was filtered and chilled. After collecting the crystalline product on a Büchner funnel, it was washed with methanol followed by low boiling petroleum ether and dried. The yield of pale yellow crystalline product was 2 grams (14.8%).

This product, which is N-(4'-benzoylbiphenyl)glycine, has two absorption peaks, a primary at 375 m$\mu$ and a secondary at 265 m$\mu$. The log of molecular extinction coefficient is 4.285.

Example III 4-amino-4'-acetylaminobiphenyl is prepared in the same manner as 4-amino-4'-benzoylbiphenyl while using acetyl chloride in lieu of benzoyl chloride.

This compound has two absorption peaks, a primary at 335 m$\mu$ and a secondary at 225 m$\mu$ with a log of molecular extinction coefficient at 4.267.

Example IV

Into a 500 ml., three-necked flask fitted with a stirrer and reflux condenser were placed 24.75 grams of 4-acetyl-4'-aminobiphenyl, 43.6 grams of ethyl bromide, 300 ml. of absolute ethanol and 16.0 grams of magnesium oxide. The resulting mixture was heated under reflux with stirring for four hours. Excess ethyl bromide was distilled off and the residue diluted with 100 ml. of ethanol, heated to a boil, charcoaled and filtered through a warm Büchner funnel. The filtrate was chilled and the yellow product was collected by filtration, washed with cold methanol and dried. The yield was 6.0 grams (23.1%).

The resulting compound, which is 4-acetyl-4'-diethylaminobiphenyl is characterized by a primary absorption peak at 338 m$\mu$ and a secondary absorption peak at 210 m$\mu$. The log of molecular extinction coefficient is 4.328.

Example V

Into a 500 ml., three-necked flask fitted with a stirrer, condenser and dropping funnel were placed 10.6 grams of 4-acetyl-4'-aminobiphenyl, 200 ml. of absolute ethanol and 2.2 grams of magnesium oxide. After heating to reflux, 6.9 grams of benzoyl chloride were added dropwise to the stirred solution over a period of one-half hour. Refluxing was continued an additional five hours and the solution filtered hot and set aside to cool. The separated solids were collected by filtration and dried. A yield of several grams was obtained.

The resulting compound, which is 4-acetyl-4'-benzylaminobiphenyl, has two absorption peaks, a primary at 350 m$\mu$ and a secondary at 210 m$\mu$ with a log of molecular extinction coefficient at 4.354.

Example VI

Into a 100 ml. round-bottom flask were placed 4.2 grams of 4-acetyl-4'-aminobiphenyl, 25 ml. of pyridine and 2.4 grams of phenylhydrazine. The reactants were heated under reflux for two and one-half hours. Ethanol, equal to about twice the volume, was then added and the solution heated to boiling, charcoaled and filtered through a fluted paper. After cooling, the crystalline product was collected by filtration, washed with methanol and dried. The yield of the product was 3.5 grams (58.5%) which had a melting point of 162–164° C.

The curve for this compound, which is 4-acetyl-4'-amino-biphenyl-phenylhydrazone, is shown in Figure II, and from this curve it will be seen that the compound has an absorption peak at about 340 m$\mu$. The estimated log of molecular extinction coefficient is 4.477.

This product is readily converted in the usual manner by acylation into 4-acetyl-4'-acetylaminobiphenyl-phenylhydrazone.

Example VII

Into a 100 ml. round-bottom flask were placed 23.7 grams of pyridine, 18.0 grams of acetic acid and 4.2 grams of 4-acetyl-4'-aminobiphenyl were dissolved therein followed by 4.2 grams of 4-sulfophenylhydrazine and about 15 ml. of water. The resulting mixture was heated under reflux for ¾ hour, then transferred to a beaker with about two volumes of water and heated to boiling. Ammonium hydroxide was then added in sufficient quantity to dissolve the solids after which the solution was charcoaled and filtered. The hot filtrate was acidified with about 15 ml. of acetic acid and set aside to cool. The solids were collected by filtration, washed with water followed by methanol and dried.

The yield of this product, which is 4-acetyl-4'-aminobiphenyl-(4''-sulfophenylhydrazone), was 6 grams (78.6%).

The compound has an absorption peak at 340 m$\mu$ with an estimated log of molecular extinction coefficient at 4.544.

Said compound by acylation in the usual manner is converted into 4-acetyl-4'-acetylaminobiphenyl-(4''-sulfophenylhydrazone).

Example VIII

A mixture of 1 gram of 4-acetyl-4'-aminobiphenyl and 1 gram of hydroxylamine hydrochloride in 10 ml. of pyridine and 5 ml. of ethanol was heated under reflux for three hours, charcoaled and filtered through a fluted paper. 10 ml. of ethanol were added to the hot filtrate which was set aside to cool. The crystallized solids were collected by filtration, washed with methanol and dried.

The resulting compound, which is 4-acetyl-4'-aminobiphenyloxime, is obtained in the form of colorless crystals having a melting point of +235° C. The yield was about .5 gram.

Said product has a primary absorption peak at 305 m$\mu$ with a secondary peak at less than 220 m$\mu$. The log of molecular extinction coefficient is 4.387.

Example IX

A mixture of 2 grams of 4-acetamino-4'-benzoylbiphenyl, 2 grams of hydroxylamine hydrochloride in 20 ml. of pyridine and 10 ml. of ethanol was heated under reflux for two hours, charcoaled and filtered. The filtrate was poured into water and the solids collected by filtration. The filter cake was dissolved in 30 ml. of ethanol at boil, charcoaled and filtered. The filtrate was reheated to boiling and water added to the cloud point, after which it was set aside to cool. The solids were again collected by filtration, washed with a small amount of cold methanol and dried.

The resulting product, which is 4-acetylamino-4'-benzoylbiphenyloxime, is obtained in a yield of approximately 0.8 gram. It has a primary absorption peak at 300 m$\mu$ and a secondary at less than 220 m$\mu$. The log of molecular extinction coefficient is 4.442.

Example X

Into a 300 ml., three-necked flask fitted with a stirrer and condenser were placed 140 ml. of water and 60 grams of potassium hydroxide. When the caustic was dissolved, 29.4 grams of 5-sulfoisatin were introduced and stirred until a light yellow solution resulted. 21.1 grams of finely ground 4-acetyl-4'-aminobiphenyl were finally added and the resulting mixture stirred under reflux for 24 hours. The reaction was cooled somewhat and filtered through a sintered glass funnel. After washing with 20% potassium chloride solution, the filter cake was suspended in 500 ml. of hot water, which was then brought to a boil and acidified with acetic acid. After filtering while hot, the filter cake was washed with hot, very dilute hydrochloric acid. The filter cake was again suspended in 500 ml. of hot water, heated to near boiling and made alkaline with ammonium hydroxide, charcoaled and filtered. The hot filtrate was acidified with acetic acid, the resulting solids collected by filtration, washed with water followed by methanol containing some acetic acid, and dried in a vacuum oven at 100° C.

The resulting cream colored product, which is 2-(4-[4'-aminobiphenyl])-6-sulfocinchoninic acid, was obtained in a yield of 25 grams (59.5%).

The curve for this product is shown in full lines in Figure III along with the curve obtained for 2-amino(3'-aminophenyl)-8-hydroxycinchoninic acid shown in dotted lines.

Example XI

The compound of Example X was converted in the usual manner by acylation to 2-(4-[4'-acetylaminobiphenyl])-6-sulfocinchoninic acid. The curve for this compound is shown in full lines in Figure IV along with the curve in dotted lines for the compound 2-(3'-aminophenyl)-3-carboxymethylcinchoninic acid.

Example XII

Into a one-liter, three-necked flask fitted with a stirrer, water take-off condenser and dropping funnel were placed 400 ml. of pyridine. A quantity of 135 grams of 2-(4-[4'-aminobiphenyl])-6-sulfocinchoninic acid was then added with stirring to produce a finely divided pyridine salt. 300 ml. of benzene were added and the resulting mixture heated under reflux while gradually removing 300 ml. of solvents by means of the take-off condenser. After cooling to room temperature, 86.5 grams of myristoyl chloride dissolved in 50 ml. of dry benzene were added with stirring by means of the dropping funnel. When addition was complete, the thick mixture was heated under reflux with stirring for one and one-half hours. The resulting dark red solution was filtered through a sintered glass funnel to remove insoluble material and the filtrate placed in a distilling flask. After removal of solvents by heating on a steam bath under vacuum, the gummy residue was dissolved by heating with 300 ml. of dimethyl formamide. The resulting solution was treated with 200 ml. of acetic acid, charcoaled and filtered through a cellite pad on a sintered glass funnel. The filtrate was reheated, acidified to Congo red paper with hydrochloric acid followed by about 150 ml. of acetic acid, and set aside to cool and crystallize. The product was collected by filtration, washed with acetic acid followed by acetone and dried.

The yellow product, which is 2-(4-[4'-myristoylaminobiphenyl])-6-sulfocinchoninic acid, was obtained in a yield of 174 grams (85.5%).

This product had a primary absorption peak at 340 m$\mu$ and a secondary peak at about 210 m$\mu$, with a log of molecular extinction coefficient of 4.401.

Example XIII

The compound 2-(4-[4'-aminobiphenyl])-6-chlorcinchoninic acid was prepared in the same manner as the compound of Example X while utilizing 5-chlorisatin in lieu of 5-sulfoisatin. The product was recrystallized by suspending in ethanol, heating to boiling and dissolving by the addition of sodium hydroxide (6 N). The resulting solution was cooled and after chilling in ice the product was collected by filtration, washed with acetone and dried. The yield of sodium salt was 81%.

This compound has two absorption peaks, a primary at 350 mµ and a secondary at 219 mµ, with a log of molecular extinction coefficient at 4.294.

Example XIV

The compound 2-(4-[4'-aminobiphenyl])-6-chloro-8-bromocinchoninic acid is prepared in the same manner as the compound of Example X while utilizing 5-chloro-7-bromoisatin in place of 5-sulfoisatin. The yield of product was 56.4%.

This product had a primary absorption peak at 360 mµ with a secondary peak at 219 mµ. The log of molecular extinction coefficient was 4.278.

Example XV

Into a copper shaker "bomb" liner were placed 10 ml. of 20% potassium hydroxide solution and 2 grams of 2-(4 - [4' - aminobiphenyl])-6-chloro-8-bromocinchoninic acid. The mixture was heated in an autoclave with shaking at 175–200° C. for six hours. The reaction was washed out of the "bomb" with about 100 ml. of water and filtered from insoluble material through a filter cell pad on a sintered glass funnel. The filtrate was acidified with hydrochloric acid and solids collected by filtration. The dark cake was suspended in water, dissolved with the aid of 6 N sodium hydroxide, charcoaled and filtered. The filtrate was acidified with acetic acid while hot, heated to near boiling, cooled and collected solids on a Büchner funnel. The yield of dark brown crude was 1.6 grams which was recrystallized from 10 ml. of 2 N hydrochloric acid.

The orange product which was obtained in a yield of 0.6 gram is 2-(4-[4'-aminobiphenyl])-6,8-dihydroxycinchoninic acid.

Said product is characterized by two absorption peaks, a primary at 310 mµ and a secondary at less than 210 mµ, with a log of molecular extinction coefficient at 4.399.

Example XVI

Into a 300 ml., three-necked flask fitted with a stirrer, take-off condenser and dropping funnel were placed 75 ml. of pyridine, 50 ml. of benzene and 8.4 grams of 2-(4-[4'-aminobiphenyl])-6-sulfocinchoninic acid. The resulting mixture was heated under reflux with stirring while gradually removing about 50 ml. of solvents by means of the take-off condenser. After cooling to 20° C., 4.2 grams of p-toluenesulfonylchloride, dissolved in 25 ml. of dry pyridine, were added dropwise with stirring over a period of one-half hour, keeping the temperature between 25–30° C. When addition was complete, the reaction was stirred at 25–30° C. for two hours. The liquid was decanted from the red gummy residue which was digested with 50 ml. of ethanol and again decanted. The gum was then suspended in 100 ml. of hot ethanol and 6 N sodium hydroxide added until a solution was obtained at the boiling point. After treating with Norit and filtering, the resulting filtrate was acidified with hydrochloric acid and the orange solids collected by filtration, washed with ethanol followed by acetone and dried. The crude product was digested with 200 ml. of boiling water, acidified with hydrochloric acid and then collected by filtration, washed with water followed by ethanol and acetone and dried. The resulting orange product, which is 2-(4-[4'-p-toluylsulfonamido])-6-sulfocinchoninic acid, was obtained in a yield of 61%.

Said product is characterized by two absorption peaks, a primary at 350 mµ and a secondary at 210 mµ. The log of molecular extinction coefficient is 4.447.

Example XVII 2-(4-[4'-methylsulfonamido])-6-sulfocinchoninic acid is prepared in the same manner as the compound of Example XVI, excepting that methylsulfonylchloride is used in lieu of p-toluylsulfonylchloride.

Said product has two absorption peaks, a primary at 355 mµ and a secondary at 220 mµ with a log of molecular extinction coefficient at 4.243.

Example XVIII

Into a 300 ml., three-necked flask fitted with a stirrer, condenser and dropping funnel were placed 100 ml. of water, 100 ml. of acetic acid and 8.4 grams of 2-(4-[4'-aminobiphenyl])-6-sulfocinchoninic acid. 6.4 grams of potassium cyanate dissolved in 50 ml. of water were added dropwise to the stirred suspension. After heating to reflux for 15 minutes, another 3.2 grams of potassium cyanate were added and refluxing continued for 15 minutes. The reaction was then acidified with hydrochloric acid, refluxed for 10 minutes and filtered hot. The filter cake, after washing with methanol, was suspended in about 250 ml. of hot water and dissolved by the addition of ammonium hydroxide. The resulting hot solution was cautiously acidified with acetic acid to a pH of 5, charcoaled and filtered. After heating to boiling, the filtrate was acidified with hydrochloric acid and the solids collected while still hot. The filter cake was washed with water followed by methanol and acetone, then dried.

The resulting reddish-brown product obtained in a yield of 7 grams is 2-(-[4'-N-ureabiphenyl])-6-sulfocinchoninic acid.

Said product is characterized by two absorption peaks, a primary at 350 mµ and a secondary at 200 mµ. The log of molecular extinction coefficient is 4.481.

Example XIX

Into a 300 ml., three-necked flask fitted with a stirrer and condenser were placed 70.0 ml. of carbon disulfide and 25.0 grams of myristoyl chloride. The resulting mixture was chilled in an ice-salt bath and 21.1 grams of finely ground 4-acetaminobiphenyl introduced. 27.0 grams of powdered anhydrous aluminum chloride were then added with good agitation while in the freezing bath, and stirred an additional two hours after the addition was completed. After standing overnight in a refrigerator, the carbon disulfide was decanted and the residue decomposed with a mixture of ice and hydrochloric acid. The solids were collected by filtration and washed well with water.

2.5 grams of this damp cake were placed in a 100 ml., one-neck flask with 40.0 ml. of acetic acid followed by 20.0 ml. of 18 N sulfuric acid. The mixture was then heated under reflux for six and one-half hours. After pouring the reaction into cold water, the separated solids were collected, washed with water followed by methanol. The material was then suspended in boiling acetone and concentrated ammonium hydroxide added until just alkaline. After filtering from the small amount of insoluble material, the filtrate was acidified with concentrated hydrochloric acid, filtered and the resulting product washed with methanol. The 4-amino-4'-myristoyl biphenyl thus obtained as the hydrochloride was recrystallized from acetic acid in a 1.5 gram yield (61%).

This product has two absorption peaks, a primary at 340 mµ and a secondary at 210 mµ with a log of molecular extinction coefficient of 4.264.

Example XX 4-acetyl-4' - acetylaminobiphenyl - phenylhydrazone is prepared by acylation in the usual manner of 4-acetyl-4'-aminobiphenyl-phenylhydrazone (Example V).

This product has two absorption peaks, a primary at 385 mμ and a secondary at 225 mμ. The log of molecular extinction coefficient is 4.705.

*Example XXI*

1.2 grams of the product of Example XI were dissolved in 58 ml. of water by the addition of 4 cc. of 10% potassium hydroxide. The resulting solution was added to 15 ml. of a 10% solution of gelatin. After further addition of 0.5 ml. of 8% saponin and 1 ml. of 1% glyoxal, the coating solution (pH-8) was heated to 40° C. with stirring for several minutes. The resulting solution was coated to a thickness of 3.9 microns onto the sensitized surface of a multilayer color film. After a four-hour drying period at 20° C., the thickness of the coating was 3.9 microns. This coating effectively resisted the action of ultra-violet light in the color images formed in the color film.

*Example XXII*

Into a 200 ml., three-necked flask fitted with a stirrer, condenser and thermometer were placed 50 ml. of quinoline and 0.1 gram of black copper oxide powder. The mixture was then heated on a metal bath to about 200° C. and 5.0 grams of 2-(4-[4'-acetylaminobiphenyl])-cinchoninic acid added in portions. After addition was completed, the reaction was heated under reflux for one and one-half hours. The mixture was then cooled to about 100° C. and filtered to remove insoluble matter. The filtrate was then diluted with high boiling petroleum ether and the separated product collected by filtration. After dissolving the crude filter cake in boiling acetic acid, the solution was charcoaled and filtered. The filtrate was then diluted to the cloud point with water, chilled and solids collected on a Büchner funnel. The resulting white filter cake was recrystallized from pyridine and washed with methanol. The yield of 2-(4-[4'-acetylaminobiphenyl])quinoline as pale yellow platelets was 1.0 gram and had a melting point in excess of 250° C.

This product has absorption peaks at 530 mμ and 500 mμ with a log of molecular extinction coefficient of 4.511.

*Example XXIII*

To 130 cc. of ethyl acetate, 10 cc. of diacetone alcohol and 30 cc. of methanol, were added 30 grams of polyvinyl butyral and 2 grams of the ultra-violet absorber of Figure II. Upon casting, a foil is obtained which may be used as an effective ultra-violet absorbing covering for colored materials.

The graphs of Figures III and IV, which include the broken line curve for the quinoline derivative and the full line for the xenylamine derivatives, establish that the particular characteristics of the U.V. absorbers involved are not attributable to the quinoline ring, but rather to the xenylamine structure. It is self-evident from a reference to the aforesaid figures that the curves for the xenylamines are far different from those of the quinolines, the properties of the former approximating the optimum for U.V. absorbers. If the characteristics of the compounds were traceable primarily to the quinoline structure, then the curves would more closely approximate each other. The fact that they do not stresses the importance of the xenylamine configuration on the characteristics of the compounds as U.V. absorbers.

The term "log of molecular extinction coefficient" as used in the examples is explained on pages 180 and 181 of "The Science of Color" written by the Committee on Colorimetry of the Optical Society of America, published by Thomas W. Crowell Company, New York, New York, and copyrighted 1953.

While the examples disclose the utilization of the U.V. absorbers involved in the preparation of protective coatings, it is to be emphasized that such absorbers may be used in any relationship where it is desired to protect a substance against the action of U.V. light. To this end, the invention broadly contemplates the employment of the U.V. absorbers in any transparent or light transmitting carrier.

Modification of the invention will occur to persons skilled in the art and we, therefore, do not intend to be limited in the patent granted except as necessitated by the appended claims.

We claim:

1. An ultra-violet absorbing composition comprising a carrier capable of forming a light transmitting solid film at ordinary temperatures, said carrier having uniformly dispersed therein an xenylamine selected from the class consisting of those of the following formulae:

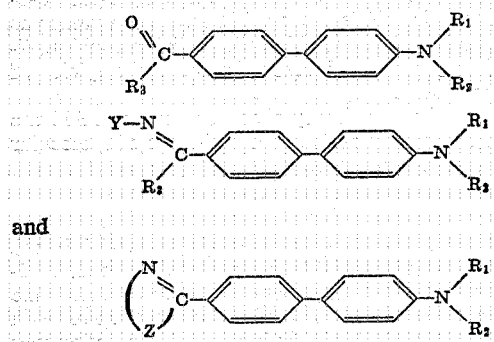

wherein $R_1$ is selected from the class consisting of hydrogen, alkyl, aralkyl and an aromatic radical, $R_2$ is selected from the class consisting of hydrogen, alkyl, carboxyalkyl, alkylsulfonyl, acyl, aralkyl and an aromatic radical, $R_3$ is selected from the class consisting of alkyl and aryl, Y is selected from the class consisting of hydroxy and arylimino and Z represents the atoms necessary to complete a quinoline ring.

2. A light sensitive photographic element having a light sensitive silver halide emulsion, said emulsion being overcoated with a colloidal carrier having uniformly dispersed therethrough an xenylamine selected from the class consisting of those of the following formulae:

wherein $R_1$ is selected from the class consisting of hydrogen, alkyl, aralkyl and an aromatic radical, $R_2$ is selected from the class consisting of hydrogen, alkyl, carboxyalkyl, alkylsulfonyl, acyl, aralkyl and an aromatic radical, $R_3$ is selected from the class consisting of alkyl and aryl, Y is selected from the class consisting of hydroxy and arylimino and Z represents the atoms necessary to complete a quinoline ring.

3. An ultra-violet absorbing composition comprising a light transmitting polyvinyl butyral resin having 4-acetyl-4'-aminobiphenyl-phenylhydrazone uniformly dispersed therein.

References Cited in the file of this patent

UNITED STATES PATENTS

| | | |
|---|---|---|
| 1,845,404 | Durr et al. | Feb. 16, 1932 |
| 2,058,725 | Schneider | Oct. 27, 1936 |
| 2,696,438 | Gaspar et al. | Dec. 7, 1954 |